(12) United States Patent
Lindoff et al.

(10) Patent No.: US 8,953,698 B2
(45) Date of Patent: Feb. 10, 2015

(54) DETECTING A TRANSMITTED OFDM SIGNAL IN A RECEIVER HAVING AT LEAST TWO RECEIVER BRANCHES

(75) Inventors: Bengt Lindoff, Bjärred (SE); Bo Lincoln, Lund (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 289 days.

(21) Appl. No.: 13/578,123

(22) PCT Filed: Feb. 3, 2011

(86) PCT No.: PCT/EP2011/051586
§ 371 (c)(1),
(2), (4) Date: Oct. 16, 2012

(87) PCT Pub. No.: WO2011/101263
PCT Pub. Date: Aug. 25, 2011

(65) Prior Publication Data
US 2013/0028354 A1    Jan. 31, 2013

Related U.S. Application Data

(60) Provisional application No. 61/307,059, filed on Feb. 23, 2010.

(30) Foreign Application Priority Data

Feb. 16, 2010    (EP) ..................................... 10153700

(51) Int. Cl.
*H04B 7/02* (2006.01)
*H04L 1/02* (2006.01)
(Continued)

(52) U.S. Cl.
CPC ......... *H04L 27/2647* (2013.01); *H04L 25/0202* (2013.01); *H04B 7/0845* (2013.01); *H04L 27/2666* (2013.01)
USPC ............ 375/267; 375/316; 375/324; 375/347

(58) Field of Classification Search
USPC .......................... 375/260, 267, 316, 324, 347
See application file for complete search history.

(56) References Cited

U.S. PATENT DOCUMENTS 7,912,137 B2 *   3/2011   Zeng et al. ..................... 375/260
8,218,690 B1 *   7/2012   Zhang ............................ 375/340
(Continued)

FOREIGN PATENT DOCUMENTS

WO         2008/028942 A1      3/2008

OTHER PUBLICATIONS

PCT International Search Report, mailed Feb. 25, 2011, in connection with International Application No. PCT/EP2011/051586.
(Continued)

*Primary Examiner* — Chieh M. Fan
*Assistant Examiner* — Freshteh N Aghdam
(74) *Attorney, Agent, or Firm* — Leffler Intellectual Property Law, PLLC

(57) ABSTRACT

A transmitted OFDM signal is detected in a receiver of a wireless communication system. The receiver has at least two receiver branches, each comprising an antenna, a front end receiver, a Discrete Fourier Transform unit, and a channel estimator. The receiver further comprises a detector for detecting received data symbols. The method comprises the steps of determining a system bandwidth associated with the transmitted signal; comparing the determined system bandwidth with a predetermined value; determining, if the system bandwidth is lower than the predetermined value, channel estimates separately for each branch, and detecting received data symbols from the received signals and corresponding channel estimates; and calculating, if the system bandwidth is higher than the predetermined value, a weighted sum of signals from each branch, determining a combined channel estimate, and detecting received data symbols from the weighted sum and the combined channel estimate.

16 Claims, 5 Drawing Sheets

(51) Int. Cl.
   *H04L 27/26* (2006.01)
   *H04B 7/08* (2006.01)
   *H04L 25/02* (2006.01)

(56) References Cited

U.S. PATENT DOCUMENTS

2005/0078649 A1* 4/2005 Tehrani et al. .............. 370/343
2005/0254589 A1* 11/2005 Higuchi et al. .............. 375/260
2008/0232497 A1* 9/2008 Hart et al. .................... 375/260

OTHER PUBLICATIONS

Marques, P. et al. "Channel estimation with array processing for the uplink of UMTS-TDD" 2002 IEEE 13th International Symposium on Personal, Indoor and Mobile Radio Communications, Sep. 15-18, 2002, Piscataway, NJ, USA, IEEE, vol. 2, Sep. 15, 2002, pp. 735-739, XP010614322, ISBN: 978-0-7803-7589-5.

3GPP Technical Specification 36.211, Version 8.9.0 Technical Specification Group Radio Access Network; Evolved Universal Terrestrial Radio Access (E-UTRA); Physical Channels and Modulation (Release 8), Dec. 2009.

* cited by examiner

DETECTING A TRANSMITTED OFDM SIGNAL IN A RECEIVER HAVING AT LEAST TWO RECEIVER BRANCHES

CROSS-REFERENCE TO RELATED APPLICATIONS

This application claims priority under 35 U.S.C. §119 to European Patent Application No. 10153700.9, filed Feb. 16, 2010, which is hereby incorporated herein by reference in its entirety. This application also claims the benefit of U.S. Provisional Application No. 61/307,059, filed Feb. 23, 2010, which is hereby incorporated herein by reference in its entirety.

TECHNICAL FIELD

Embodiments of the invention relate to a method and a receiver for detecting a transmitted Orthogonal Frequency Division Multiplexing signal in a wireless communication system, wherein the receiver has at least two receiver branches.

BACKGROUND

In the forthcoming evolution of the mobile cellular standards like Global System for Mobile Communication (GSM) and Wideband Code Division Multiple Access (WCDMA), new transmission techniques like Orthogonal Frequency Division Multiplexing (OFDM) will occur. A proposal for such a new flexible cellular system is Third Generation (3G) Long Term Evolution (3G LTE) that can be seen as an evolution of the 3G WCDMA standard. Such a system is described in e.g. TS 36.211, "Evolved Universal Terrestrial Radio Access (E-UTRA); Physical channels and modulation", 3GPP, Release 8. This system will use OFDM as multiple access technique (called OFDMA) in the downlink.

A Mobile terminal supporting 3G LTE Release 8 is required to have two receive antennas, as well as is required to support bandwidths between 1.4 and 20 MHz. In general an OFDM receiver with two receive antennas consist of two front end receivers with analog radios and analog-to-digital converters, and a baseband processor including (among other things) two Fast Fourier Transforms (FFT), channel estimation blocks for all channel paths and a channel demodulation block. The complexity of these baseband blocks scales linearly with bandwidth.

One of the major driving factors for the cost of a mobile platform is the baseband chip area. This is especially true for low cost/high volume terminals, maybe not supporting the highest LTE data rates. Further, for high capacity OFDM system a large part of the chip area is memory where intermediate results are stored. An example is sub-carrier data that must be stored for the demodulation until the channel estimation has been completed. As a practical example; assume a 20 MHz 3GPP LTE system and a mobile terminal with 2 receive antennas and 1200 sub-carriers and a delay in the channel estimator of 7 symbols. This means that we have to store 16800 complex values, where each complex value may take 2*8 bits, which summarize to approximately 150 Kbits of memory. For more advanced setups these baseband parts need to have even more memory. For comparison, the total baseband memory (incl. memory for HARQ (Hybrid Automatic Repeat Request), etc) is 2 times that size in the 20 MHz case and hence the channel estimation part above consists of a significantly large part of the total memory needed.

Furthermore, the channel estimation part scales with bandwidth. Hence a system bandwidth of 20 MHz requires approximately twice the memory compared to a system bandwidth of 10 MHz. However, looking at the most likely LTE deployments, bandwidths above 10 MHz will likely become quite rare and system and the high volume of LTE modems will be in the 3-10 MHz system case. If low cost terminals uses prior art receivers designed for supporting optimum performance also for the rare 20 MHz bandwidth, the overall chip area (cost) might be too large, reducing the margin per platform.

Thus there is a need for receivers still fulfilling the LTE 20 MHz requirements, but optimized for low cost and optimized performance for lower bandwidths.

Therefore, it is an object of embodiments of the invention to provide a method in which requirements for a high system bandwidth can be fulfilled with a reduced memory capacity.

SUMMARY

According to embodiments of the invention the object is achieved in a method of detecting a transmitted Orthogonal Frequency Division Multiplexing signal in a receiver of a wireless communication system, wherein the receiver has at least two receiver branches, each branch comprising an antenna, a front end receiver, a Discrete Fourier Transform unit for obtaining a frequency domain received signal, and a channel estimator for determining a channel estimate from the frequency domain received signal; the receiver further comprising a detector for detecting received data symbols from the frequency domain received signals and corresponding channel estimates.

The method comprises the steps of determining a system bandwidth associated with said transmitted signal; comparing the determined system bandwidth with a predetermined value; determining, if the determined system bandwidth is lower than the predetermined value, channel estimates separately for each branch, and detecting the received data symbols from the frequency domain received signals and corresponding channel estimates; and calculating, if the determined system bandwidth is higher than the predetermined value, a weighted sum of signals from each branch, determining a combined channel estimate from said weighted sum, and detecting the received data symbols from the weighted sum and the combined channel estimate.

Determining channel estimates separately for low system bandwidths ensures optimal performance, e.g. measured as a symbol error rate, for these bandwidths. On the other hand, calculating a weighted sum of the signals and thus determining only a combined channel estimate for high bandwidths, the memory requirements for these bandwidths are reduced considerably. Although the performance in this situation is somewhat reduced, this will normally be fully acceptable since these high system bandwidths only rarely occur.

The method may further comprise the steps of determining from said combined channel estimate a channel quality indicator; and determining from said channel quality indicator weight factors to be used in the calculation of said weighted sum.

In one embodiment, the weighted sum is calculated from time domain signals and subsequently fed to a Discrete Fourier Transform unit for obtaining a common frequency domain received signal. By taking the weighted sum before the Discrete Fourier Transform unit the Fourier Transform computation burden is relaxed because the transform does not need to be calculated for each branch.

Alternatively, the weighted sum may be calculated from the frequency domain received signals obtained from the Discrete Fourier Transform units of each branch.

In the latter case, a weighted sum may be calculated separately for individual sub-carriers or groups of sub-carriers using weight factors determined for said individual sub-carriers or groups of sub-carriers. Thus, if the weighted sum is taken after the Discrete Fourier Transform unit the use of different weights for individual sub-carriers or groups of sub-carriers is possible. This allows better tuning at the cost of more calculations.

Some embodiments of the invention also relate to a receiver configured to receive a transmitted Orthogonal Frequency Division Multiplexing signal in a wireless communication system, the receiver comprising at least two receiver branches, each branch comprising an antenna, a front end receiver, a Discrete Fourier Transform unit for obtaining a frequency domain received signal, and a channel estimator for determining a channel estimate from the frequency domain received signal; and a detector for detecting received data symbols from the frequency domain received signals and corresponding channel estimates. The receiver is configured to determine a system bandwidth associated with said transmitted signal; compare the determined system bandwidth with a predetermined value; determine, if the determined system bandwidth is lower than the predetermined value, channel estimates separately for each branch, and detect the received data symbols from the frequency domain received signals and corresponding channel estimates; and calculate, if the determined system bandwidth is higher than the predetermined value, a weighted sum of signals from each branch, determine a combined channel estimate from said weighted sum, and detect the received data symbols from the weighted sum and the combined channel estimate.

Embodiments corresponding to those mentioned above for the method also apply for the receiver.

The Discrete Fourier Transform unit may be a Fast Fourier Transform unit.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION OF EMBODIMENTS

Figure 1:
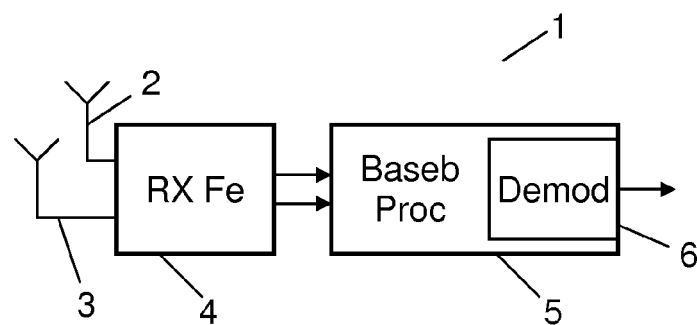
FIG. 1 shows a block diagram of a receiver circuit of a mobile terminal.

A block diagram of a receiver circuit 1 of a mobile terminal in which the invention can be used is shown in FIG. 1. As an example, it can be an OFDM receiver for a 3G LTE, Release 8 cellular system, in which a mobile terminal is required to have at least two receiver antennas 2, 3. The receiver comprises a receiver chain or receiver branch for each antenna. Thus a transmitted signal is received through the two antennas 2, 3 and then downconverted to digital baseband signals in a receiver front end 4 having two analog radio front end receivers and two analog-to-digital converters. The receiver further comprises a baseband processor 5 including among other things two Fast Fourier Transform (FFT) units, two channel estimation blocks and a demodulation or detector block 6, in which the received data symbols are detected. It is noted that the Fast Fourier Transform is a specific implementation of a Discrete Fourier Transform (DFT). Thus although the term FFT is used in the following description, another type of DFT could be used as well.

Figure 2:
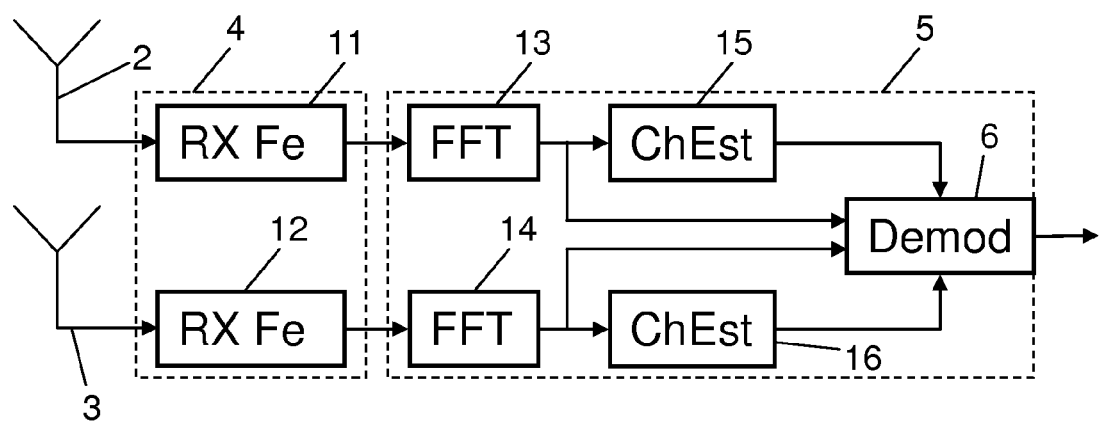
FIG. 2 shows a more detailed block diagram for such a receiver.

FIG. 2 shows a more detailed block diagram for such a receiver. The front end receiver 4 has two front end circuits 11, 12, i.e. one for each receiver antenna. In the baseband processor 5 the two FFT units 13, 14 perform FFT of the received digital baseband signals to obtain signal representations in the frequency domain, and each frequency domain signal is then fed to one of the two channel estimation block 15, 16, which estimates the corresponding transmission channel. The two frequency domain signals are also fed to the demodulation/detector block 6, in which the channel estimates are used to detect the received data symbols from the corresponding frequency domain signals.

As mentioned above, the memory consumption in the channel estimation part in an OFDM receiver scales with the required system bandwidth, which can be determined by the mobile terminal once the connection setup/camping/registration is done with the system. An OFDM receiver for a 3G LTE, Release 8 system is required to support system bandwidths up to 20 MHz. However, especially in low cost/high volume terminals such high bandwidths will only rarely be used.

Therefore, the memory consumption in the channel estimation part can be reduced by detecting the currently required system bandwidth and comparing it to a predetermined value, typically half the maximum supported system bandwidth. Thus in the above case with a maximum supported system bandwidth of 20 MHz, the predetermined value can be 10 MHz. As long as the system bandwidth is lower than the predetermined value, a receiver as described above is used. In case of a system bandwidth larger than the predetermined value a modified receiver scheme with reduced memory consumption as described below is used instead. Although this scheme will have a somewhat reduced performance, this will normally be acceptable since these high bandwidths are only rarely used.

Figure 3:
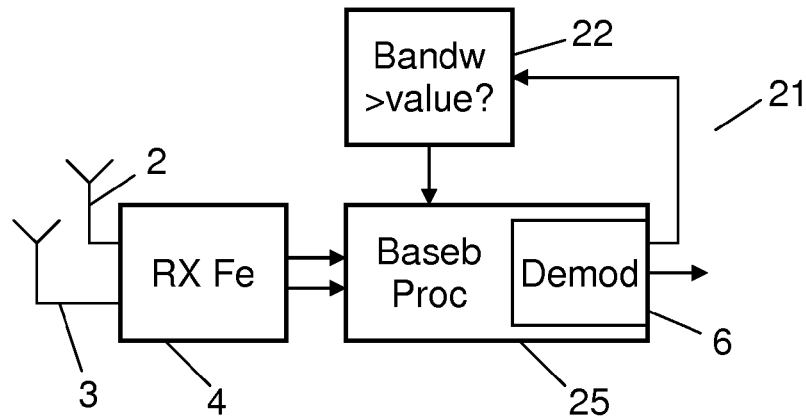
FIG. 3 shows a block diagram of a receiver circuit modified to detect a system bandwidth and perform baseband processing accordingly.

FIG. 3 shows a block diagram of a receiver circuit 21 modified accordingly. The bandwidth circuit 22 detects the required system bandwidth and compares it to the predetermined value. In dependence of the result the bandwidth circuit 22 controls the baseband processor 25 to use the appropriate receiver scheme.

Embodiments of the invention address the memory consumption in the channel estimation part in an OFDM receiver by making a weighted sum of the received signals from the (at least) two receiver antennas before or after the FFT. In case the system bandwidth is larger than the predetermined value (say larger than 10 MHz), the two antenna streams are combined, i.e. according to the equation $$\tilde{r} = w_1 r_1 + w_2 r_2 = A_1 \exp(i\phi_1) r_1 + A_2 \exp(i\phi_2) r_2,$$

where $r_i$ is i:th receiver chain and $w_i$ is the corresponding complex weight. Since there is only one received signal after the FFT unit when using the invention, this means only half of the memory is needed in the channel estimation stages compared to existing solutions. The weights $w_1$ and $w_2$ are chosen so that they maximize the received SINR.

In case the system bandwidth is lower than the predetermined value, then prior art channel estimation and combination is done.

With the proposed scheme the memory requirements for (the rare case of) large (20 MHz) system bandwidth can be reduced to the (commonly used) 10 MHz case. In the example above, the reduction in memory size is approximately ⅓. Further, the worst case scenario for the channel estimation, channel demodulation and CQI reporting become less computational demanding.

Figure 4:
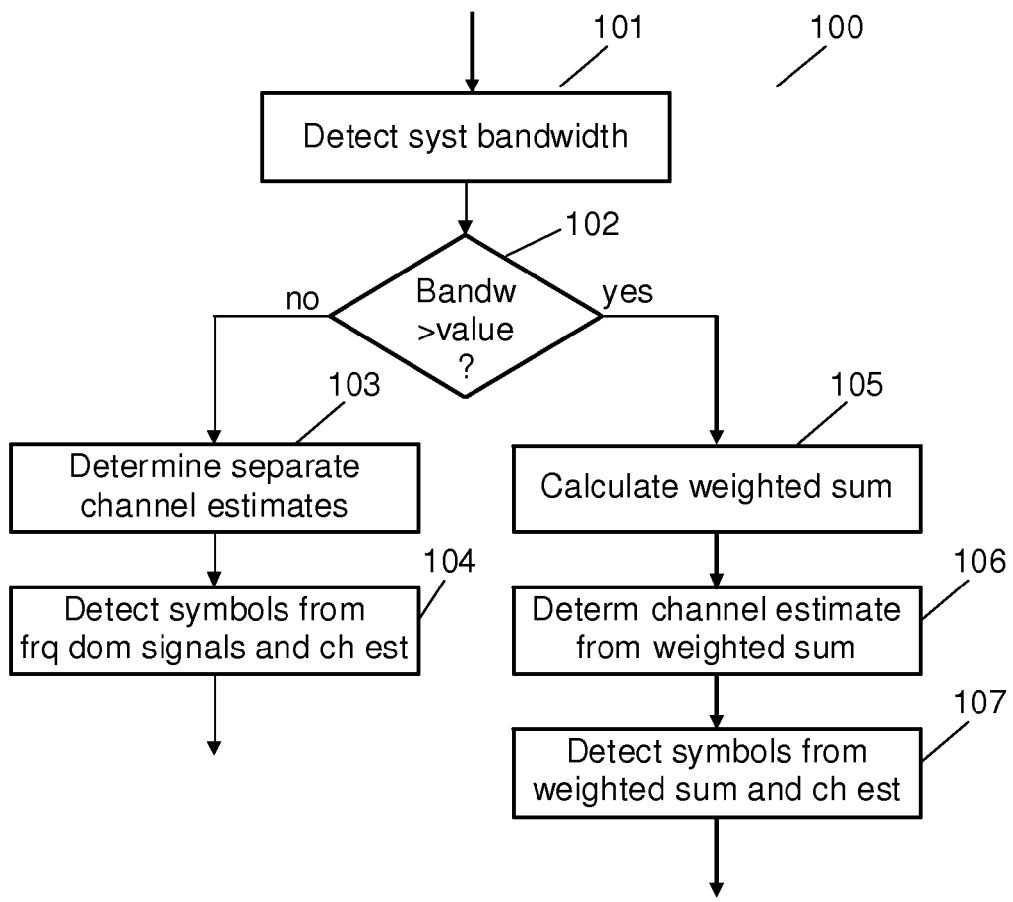
FIG. 4 shows a flowchart of a suggested receiver scheme.

FIG. 4 shows a flowchart 100 of the suggested receiver scheme. In step 101 the currently required system bandwidth is detected, and the result is compared to a predetermined value in step 102. If the required system bandwidth is less than the predetermined value, a channel estimate for each receiver branch, i.e. each antenna, is determined in step 103 as it was illustrated in FIG. 2, and the received data symbols are detected in step 104 from the two frequency domain signals and the corresponding channel estimates. If on the other hand, the required system bandwidth is larger than the predetermined value, a weighted sum of the signals received in the two receiver branches is calculated in step 105. As it will be described below, the weighted sum can be taken either before or after the FFT units. In step 106 a single channel estimate is then determined from the weighted sum, and this estimate is used in step 107 for detecting the received data symbols from the weighted sum.

Figure 5:
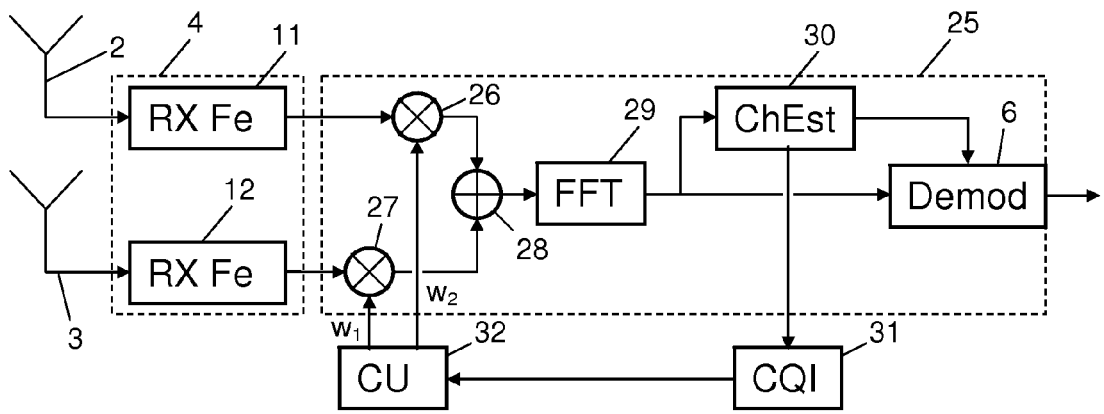
FIG. 5 shows a block diagram of an embodiment where a weighted sum is taken before the FFT.

As mentioned above, the weighted sum of the received signals from the two antennas can be made either before or after the FFT unit. FIG. 5 shows a block diagram of an embodiment where the sum is taken before the FFT unit, i.e. in the time domain. Thus in the baseband processor 25 the signals from the two front end circuits 11, 12 are fed to multiplicators 26, 27 where the two weights $w_1$ and $w_2$ are applied to the signals, and the two weighted signals are then added to each other in the adder 28 to achieve the weighted sum. The weighted sum is then fed to the single FFT unit 29 to obtain the frequency domain signal. From this signal the single channel estimator 30 estimates the transmission channel, and the result is used in the demodulator block 6 to detect the received data symbols from the frequency domain signal. Channel estimates and noise estimates are also signalled from the channel estimator 30 to a channel quality computation unit 31, and the channel quality (e.g. SINR or Mutual Information) is sent to a control unit 32 that calculates the weights $w_1$ and $w_2$.

Figure 6:
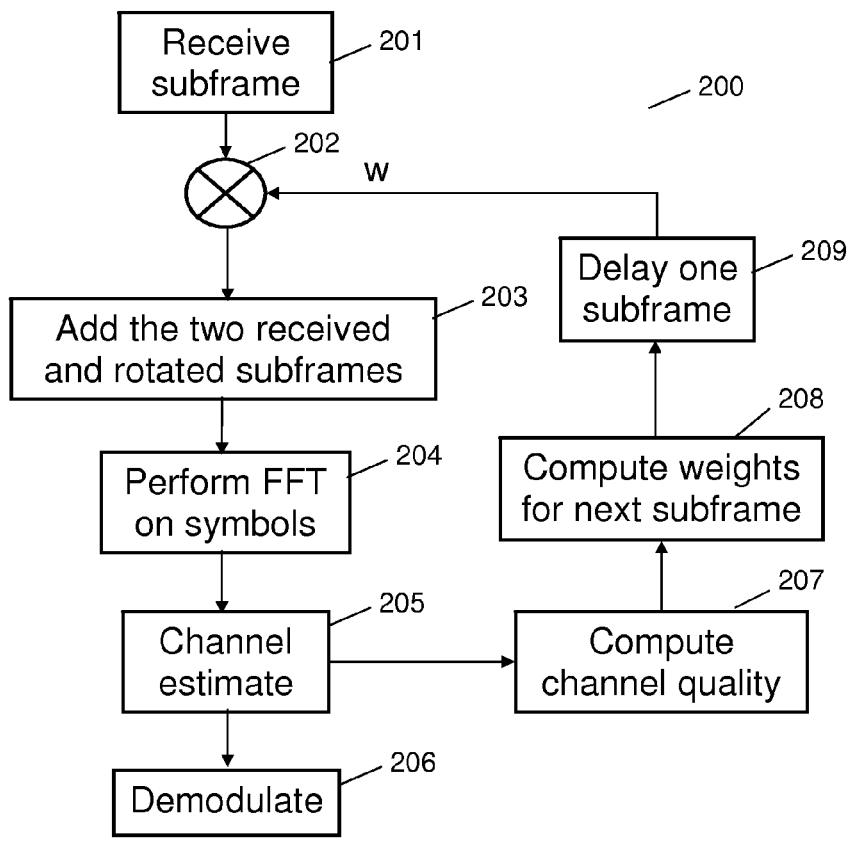
FIG. 6 shows a flowchart corresponding to the block diagram of FIG. 5.

A corresponding flow chart 200 is shown in FIG. 6. At step 201 the signals are received from the two receiver front ends. At step 202 the signals are multiplied by weights, which are delayed responses from the control unit 32. In step 203 the signals after the weighting are then summed together. Step 204 takes the FFT of the received signals. The channel estimation on the one combined signal is then done in step 205 and in step 206 the demodulation is done. From the channel estimation block channel estimates and noise estimates are signaled to the channel quality computation unit 31 for computation of the channel quality in step 207. The channel quality can for example be SINR or Mutual Information. The channel quality is sent to the weight computation block (control unit 32), where the weights $w_1$ and $w_2$ are computed in step 208. Finally, the computed weights are delayed in step 209 before they are applied for the next subframe in step 202.

Figure 7:
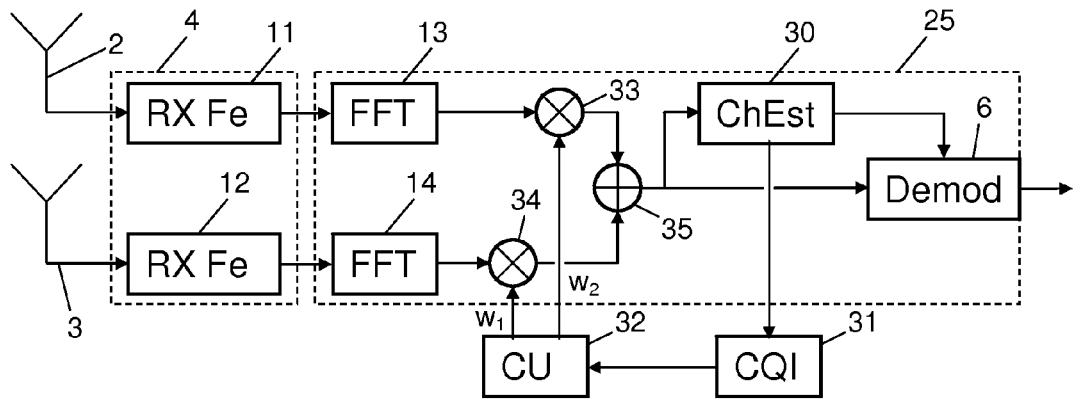
FIG. 7 shows a block diagram of an embodiment where a weighted sum is taken after the FFT.

FIG. 7 shows a block diagram of an embodiment where the sum is taken after the FFT unit, i.e. in the frequency domain. Thus in the baseband processor 25 the signals from the two front end circuits 11, 12 are fed to the two FFT units 13 and 14 as in FIG. 2 to obtain the frequency domain signals. The two frequency domain signals are then fed to multiplicators 33, 34 where the two weights $w_1$ and $w_2$ are applied to the signals, and the two weighted signals are then added to each other in the adder 35 to achieve the weighted sum. From this weighted sum the single channel estimator 30 estimates the transmission channel, and the result is used in the demodulator block 6 to detect the received data symbols from the frequency domain signal. Channel estimates and noise estimates are also signalled from the channel estimator 30 to a channel quality computation unit 31, and the channel quality (e.g. SINR or Mutual Information) is sent to a control unit 32 that calculates the weights $w_1$ and $w_2$.

Figure 8:
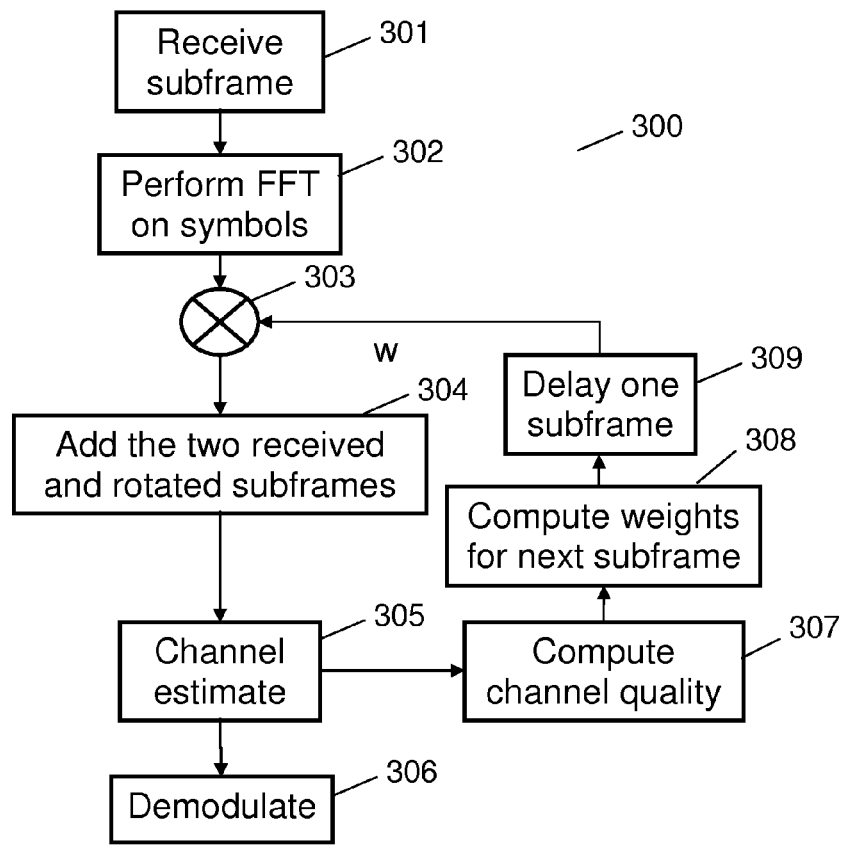
FIG. 8 shows a flowchart corresponding to the block diagram of FIG. 7.

A corresponding flow chart 300 is shown in FIG. 8. At step 301 the signals are received from the two receiver front ends. Step 302 takes the FFT of the received signals. At step 303 the signals are multiplied by weights, which are delayed responses from the control unit 32. In step 304 the signals after the weighting are then summed together. The channel estimation on the one combined signal is then done in step 305 and in step 306 the demodulation is done. From the channel estimation block channel estimates and noise estimates are signaled to the channel quality computation unit 31 for computation of the channel quality in step 307. The channel quality can for example be SINR or Mutual Information. The channel quality is sent to the weight computation block (control unit 32), where the weights $w_1$ and $w_2$ are computed in step 308. Finally, the computed weights are delayed in step 309 before they are applied for the next subframe in step 303.

Figure 9:
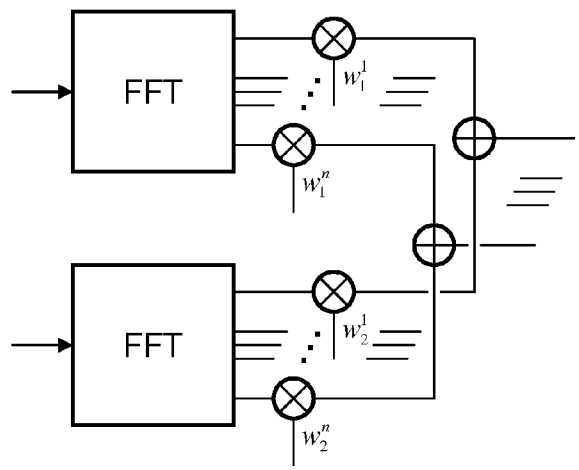
FIG. 9 shows an embodiment using different weights for different sub-carriers.

In the embodiment shown in FIGS. 7 and 8, i.e. where the weighted sum is taken after the FFT units, the weights may be different for different sub-carriers. This means that individual sub-carriers or groups of sub-carriers may be weighted with a different weight factor. This is illustrated in FIG. 9 where the common weights $w_1$ and $w_2$ are replaced by the individual weights $w_1^1, w_1^2, \ldots, w_2^n$, and $w_2^1, w_2^2, \ldots, w_2^n$, respectively, where n refers to the number of sub-carriers or groups of sub-carriers. In this case also the channel estimate and the channel quality are computed for each sub-carrier or group of sub-carriers, so that the control unit can calculate the individual weights.

There are many ways to compute the weights. It is possible to let one of the weights be equal to one, e.g. $w_1 = 1$. As an even more simple control the other weight can have either constant amplitude or constant phase, i.e. one can let either $A_2 = 1$ or $\phi_2 = 1$.

As an example of a control algorithm we let $A_1 = 1$, $\phi_1 = 1$ and $A_2 = 1$. Thus we only use $\phi_2$ for controlling the weights. An update algorithm could be

```
If SNR<SNR_prev
    dir = (-1)*dir
end
φ_2 = φ_2 + dir * δ
``` where delta is a suitable step size, SNR is the current channel quality and $SNR_{prev}$ is the channel quality from previous subframe. As starting values we choose dir=1 and $\phi_2$=0.

Figure 10:
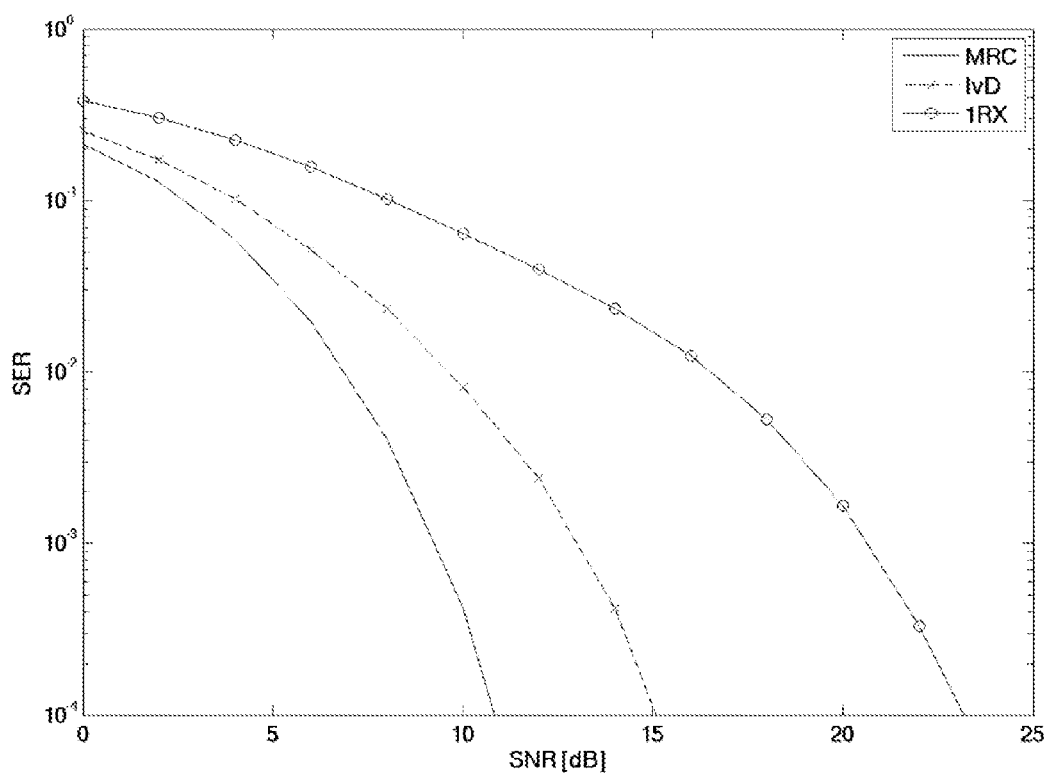
FIG. 10 shows the Symbol Error Rate as a function of the Signal-to-Noise Ratio for different receiver schemes.

FIG. 10 shows the Symbol Error Rate (SER) as function of the Signal-to-Noise Ratio (SNR) for an optimal receiver algorithm for 2 receiver antennas MRC), an optimal receiver algorithm for 1 receiver antenna (1 RX) and the solution provided by the solution described above (IvD) and the above given update of the weights. Thus it can be seen that although the performance of the suggested solution is reduced compared to the optimal algorithm for two receiver antennas, it is still considerably better than the performance of receiver with only one antenna.

Above it is assumed that there are two receiver antennas, if there are more receiver antennas the problem can be addressed in a similar way. It is also possible to have more than one output after the weighted sum, as long as the number of outputs is less than number of inputs. Hence, it is possible to combine more than two receiver chains and possible to have more than one output. However, with more inputs and outputs there are more control parameters that have to be estimated.

The suggested solution reduces the needed memory for channel estimation and channel demodulation by 50%, and the total baseband chip area by 33%, in the example above. There are also relaxed requirements on the channel estimation, channel demodulation and CQI reporting computation, which worst cases need less MIPS. Hence the chip area and cost for OFDM mobile platform are reduced. The performance is in between the optimal receiver for two receiver chains and the optimal receiver for one receiver chain.

Although various embodiments of the present invention have been described and shown, the invention is not restricted thereto, but may also be embodied in other ways within the scope of the subject-matter defined in the following claims.

The invention claimed is:

1. A method of detecting a transmitted Orthogonal Frequency Division Multiplexing signal in a receiver of a wireless communication system, wherein the receiver has at least two receiver branches, each branch comprising an antenna, a front end receiver, a Discrete Fourier Transform unit for obtaining a frequency domain received signal, and a channel estimator for determining a channel estimate from the frequency domain received signal; the receiver further comprising a detector for detecting received data symbols from the frequency domain received signals and corresponding channel estimates, the method comprising the steps of:
   determining a system bandwidth associated with said transmitted signal;
   comparing the determined system bandwidth with a predetermined value;
   determining, if the determined system bandwidth is lower than the predetermined value, channel estimates separately for said each branch, and detecting the received data symbols from the frequency domain received signals and the corresponding channel estimates; and
   calculating, if the determined system bandwidth is higher than the predetermined value, a weighted sum of signals from said each branch, determining a combined channel estimate from said weighted sum, and detecting the received data symbols from the weighted sum and the combined channel estimate.

2. A method according to claim 1, the method further comprising the steps of:
   determining from said combined channel estimate a channel quality indicator; and
   determining from said channel quality indicator weight factors to be used in the calculation of said weighted sum.

3. A method according to claim 1, wherein said weighted sum is calculated from time domain signals and subsequently fed to one Discrete Fourier Transform unit for obtaining a common frequency domain received signal.

4. A method according to claim 1, wherein said weighted sum is calculated from the frequency domain received signals obtained from the Discrete Fourier Transform unit of said each branch.

5. A method according to claim 4, wherein a weighted sum is calculated separately for individual sub-carriers or groups of sub-carriers using weight factors determined for said individual sub-carriers or groups of sub-carriers.

6. A receiver configured to receive a transmitted Orthogonal Frequency Division Multiplexing signal in a wireless communication system, the receiver comprising:
   at least two receiver branches, each branch comprising an antenna, a front end receiver, a Discrete Fourier Transform unit for obtaining a frequency domain received signal, and a channel estimator for determining a channel estimate from the frequency domain received signal; and
   a detector for detecting received data symbols from the frequency domain received signals and corresponding channel estimates,
   wherein the receiver is configured to:
   determine a system bandwidth associated with said transmitted signal;
   compare the determined system bandwidth with a predetermined value;
   determine, if the determined system bandwidth is lower than the predetermined value, channel estimates separately for said each branch, and detect the received data symbols from the frequency domain received signals and the corresponding channel estimates; and
   calculate, if the determined system bandwidth is higher than the predetermined value, a weighted sum of signals from said each branch, determine a combined channel estimate from said weighted sum, and detect the received data symbols from the weighted sum and the combined channel estimate.

7. A receiver according to claim 6, wherein the receiver is further configured to:
   determine from said combined channel estimate a channel quality indicator; and
   determine from said channel quality indicator weight factors to be used in the calculation of said weighted sum.

8. A receiver according to claim 6, wherein the receiver is configured to calculate said weighted sum from time domain signals and to subsequently feed the weighted sum to one Discrete Fourier Transform unit for obtaining a common frequency domain received signal.

9. A receiver according to claim 6, wherein the receiver is configured to calculate said weighted sum from the frequency domain received signals obtained from the Discrete Fourier Transform unit of said each branch.

10. A receiver according to claim 9, wherein the receiver is configured to calculate a weighted sum separately for individual sub-carriers or groups of sub-carriers using weight factors determined for said individual sub-carriers or groups of sub-carriers.

11. A receiver according claim 6, wherein the Discrete Fourier Transform unit is a Fast Fourier Transform unit.

12. A nontransitory computer readable storage medium having stored thereon program code for performing a method of detecting a transmitted Orthogonal Frequency Division Multiplexing signal in a receiver of a wireless communication system when said program code is run on a computer, wherein the receiver has at least two receiver branches, each branch comprising an antenna, a front end receiver, a Discrete Fourier Transform unit for obtaining a frequency domain received signal, and a channel estimator for determining a channel estimate from the frequency domain received signal; the receiver further comprising a detector for detecting received data symbols from the frequency domain received signals and corresponding channel estimates, the method comprising the steps of:

determining a system bandwidth associated with said transmitted signal;

comparing the determined system bandwidth with a predetermined value;

determining, if the determined system bandwidth is lower than the predetermined value, channel estimates separately for said each branch, and detecting the received data symbols from the frequency domain received signals and the corresponding channel estimates; and calculating, if the determined system bandwidth is higher than the predetermined value, a weighted sum of signals from said each branch, determining a combined channel estimate from said weighted sum, and detecting the received data symbols from the weighted sum and the combined channel estimate.

13. A nontransitory computer readable storage medium according to claim 12, the method further comprising the steps of:

determining from said combined channel estimate a channel quality indicator; and determining from said channel quality indicator weight factors to be used in the calculation of said weighted sum.

14. A nontransitory computer readable storage medium according to claim 12, wherein said weighted sum is calculated from time domain signals and subsequently fed to one Discrete Fourier Transform unit for obtaining a common frequency domain received signal.

15. A nontransitory computer readable storage medium according to claim 13, wherein said weighted sum is calculated from the frequency domain received signals obtained from the Discrete Fourier Transform unit of said each branch.

16. A nontransitory computer readable storage medium according to claim 15, wherein a weighted sum is calculated separately for individual sub-carriers or groups of sub-carriers using weight factors determined for said individual sub-carriers or groups of sub-carriers.

* * * * *